(12) United States Patent
Yamauchi et al.

(10) Patent No.: US 10,620,809 B2
(45) Date of Patent: Apr. 14, 2020

(54) DISPLAY DEVICE AND NON-TRANSITORY COMPUTER READABLE MEDIUM

(71) Applicant: FUJI XEROX CO., LTD., Tokyo (JP)

(72) Inventors: Akihito Yamauchi, Kanagawa (JP); Yoshihiko Nemoto, Kanagawa (JP); Masahiro Sato, Kanagawa (JP); Tsutomu Kimura, Kanagawa (JP); Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 35 days.

(21) Appl. No.: 15/484,677

(22) Filed: Apr. 11, 2017

(65) Prior Publication Data
US 2018/0136826 A1 May 17, 2018

(30) Foreign Application Priority Data
Nov. 16, 2016 (JP) .................................. 2016-223503

(51) Int. Cl.
*G06F 3/0484* (2013.01)
*G06F 3/045* (2006.01)
*G06F 3/0485* (2013.01)

(52) U.S. Cl.
CPC ........ *G06F 3/04845* (2013.01); *G06F 3/0485* (2013.01); *G06F 2203/04102* (2013.01)

(58) Field of Classification Search
CPC .... G06F 3/04845; G06F 3/0485; G06F 3/041; H04M 1/72519; H04M 1/72538
See application file for complete search history.

(56) References Cited

U.S. PATENT DOCUMENTS

| | | | |
|---|---|---|---|
| 8,543,166 B2* | 9/2013 | Choi | G06F 1/1601 345/156 |
| 9,448,660 B2* | 9/2016 | Seo | G06F 3/0487 |
| 9,459,656 B2* | 10/2016 | Shai | G06F 1/1615 |
| 9,524,049 B2* | 12/2016 | Yun | G06F 3/0414 |
| 9,606,648 B2* | 3/2017 | Seo | G06F 3/041 |
| 9,710,079 B2* | 7/2017 | Yoon | G06F 3/041 |
| 9,778,766 B2* | 10/2017 | Choi | H04M 1/0268 |
| 2013/0162556 A1 | 6/2013 | Yu | |
| 2015/0338888 A1* | 11/2015 | Kim | G06F 1/1677 345/156 |
| 2016/0299579 A1* | 10/2016 | Kim | G09G 5/006 |

FOREIGN PATENT DOCUMENTS

JP 2013-134771 A 7/2013

* cited by examiner

*Primary Examiner* — Sardis F Azongha
(74) *Attorney, Agent, or Firm* — Oliff PLC

(57) ABSTRACT

A display device includes an image display, a detection unit, and an execution unit. The image display includes a display screen at least one end portion of which is deformable. The detection unit detects deformation of the end portion. The execution unit executes a predetermined process if the detection unit detects the deformation of the end portion.

10 Claims, 9 Drawing Sheets

DISPLAY DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-223503 filed Nov. 16, 2016.

BACKGROUND

Technical Field

The present invention relates to a display device and a non-transitory computer readable medium.

SUMMARY

According to an aspect of the invention, there is provided a display device including an image display, a detection unit, and an execution unit. The image display includes a display screen at least one end portion of which is deformable. The detection unit detects defamation of the end portion. The execution unit executes a predetermined process if the detection unit detects the deformation of the end portion.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described in detail with reference to the attached drawings.

Figure 1A:
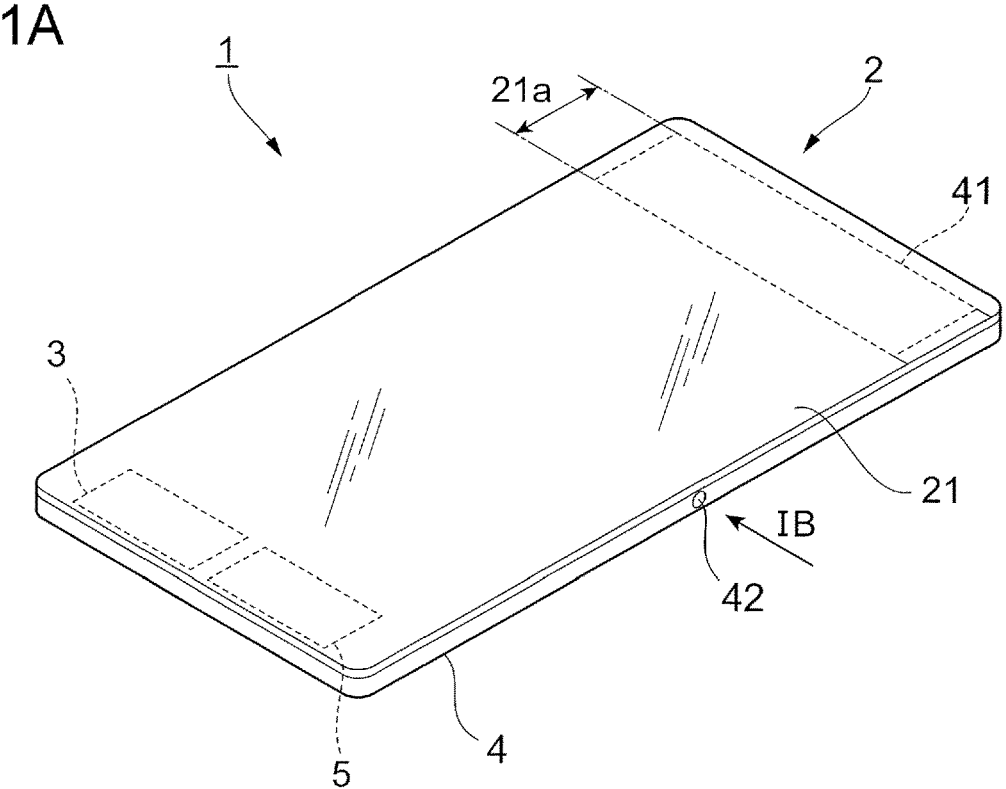
FIGS. 1A, 1B, and 1C are respectively an overall diagram of a terminal apparatus according to an exemplary embodiment, a diagram of the terminal apparatus viewed from a side of the terminal apparatus, and a diagram illustrating the terminal apparatus in a folded state.
Figure 1B:
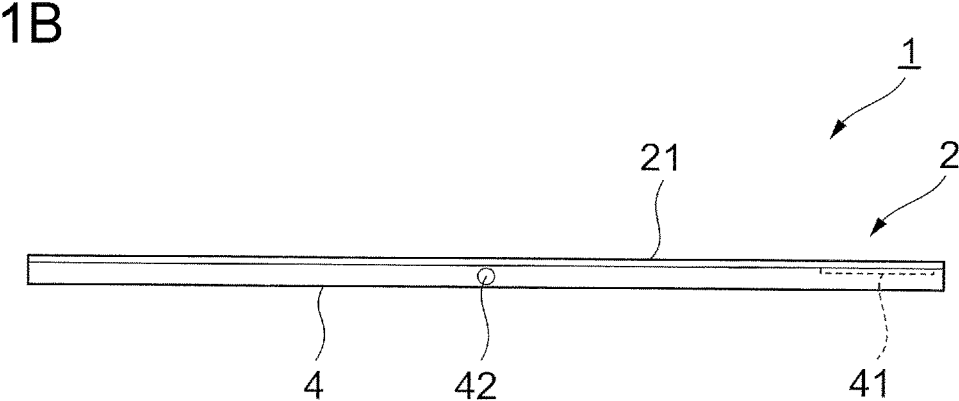
Figure 1C:
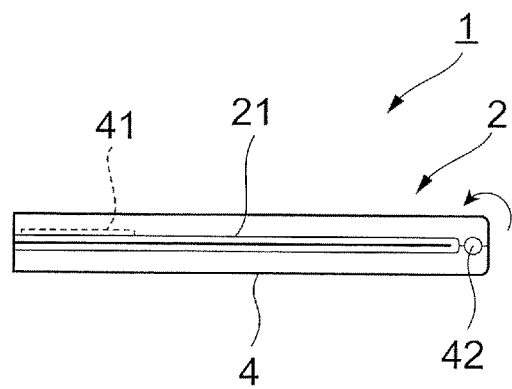

FIG. 1A is an overall diagram of a terminal apparatus 1 according to the exemplary embodiment. FIG. 1B is a diagram of the terminal apparatus 1 viewed from a side of the terminal apparatus 1 (in the direction indicated by arrow IB in FIG. 1A). FIG. 1C is a diagram illustrating the terminal apparatus 1 in a folded state. Further, FIGS. 2A to 2F are diagrams illustrating forms of the terminal apparatus 1 in deformed states.

As illustrated in FIG. 1A, the terminal apparatus 1 that is an example of a display device includes an image display 2 that displays an image and a body 4 that supports the image display 2. The terminal apparatus 1 also includes a controller 3 that performs overall control on the terminal apparatus 1 and a power controller 5 that switches on and off the terminal apparatus 1.

The image display 2 includes a display screen 21 that displays the image. The display screen 21 functions as a touch panel. For example, an organic electroluminescent (EL) display is usable as the display screen 21.

The display screen 21 in this exemplary embodiment is deformable.

Figure 2A:
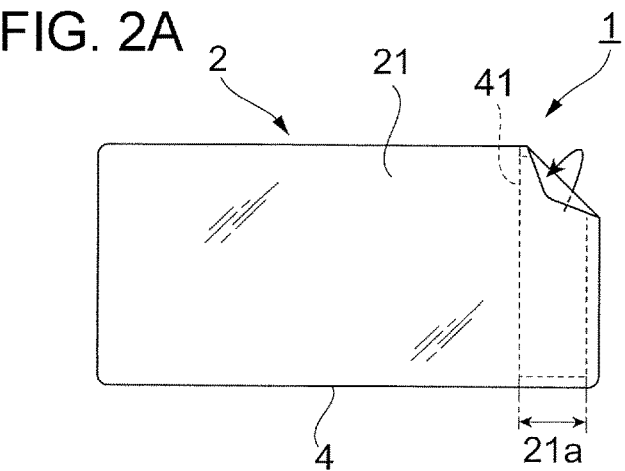
FIGS. 2A, 2B, 2C, 2D, 2E, and 2F are diagrams illustrating forms of the terminal apparatus in deformed states.
Figure 2B:
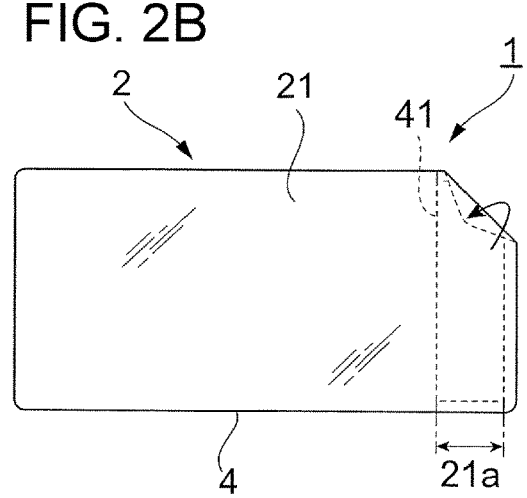

As illustrated in FIG. 2A, the user may bend an upper-right corner portion of the display screen 21 toward them self. As illustrated in FIG. 2B, the user may also bend the upper-right corner portion of the display screen 21 away from them self.

Figure 2C:
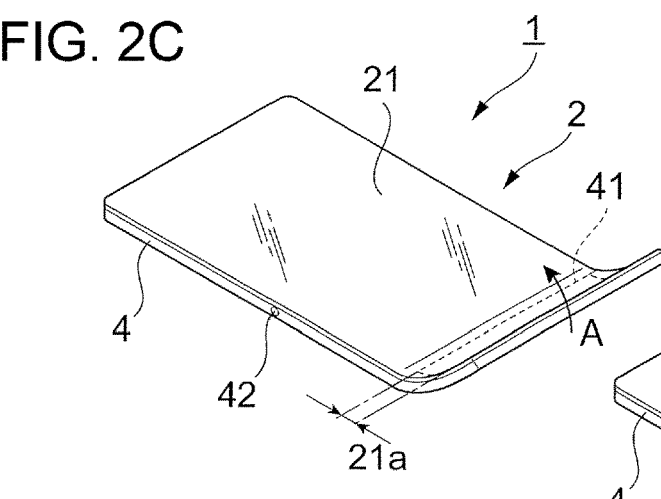
Figure 2D:
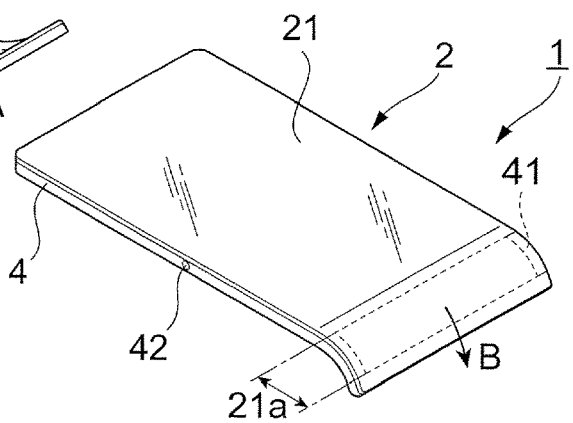

As illustrated in FIG. 2C, the user may also bend a whole end portion of the display screen 21 (a right end portion in a longitudinal direction of the display screen 21) in a direction indicated by arrow A in FIG. 2C. As illustrated in FIG. 2D, the user may also bend the whole right end portion of the display screen 21 in a direction indicated by arrow B in FIG. 2D.

Figure 2E:
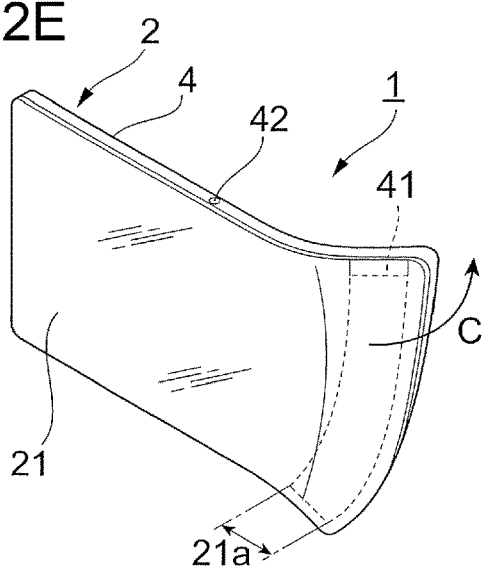
Figure 2F:
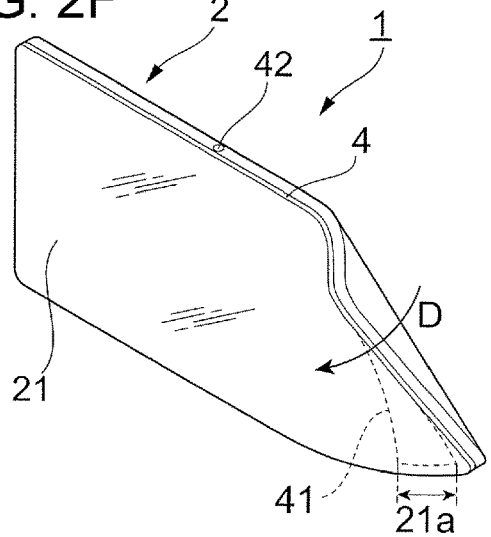

Further, as illustrated in FIG. 2E, the user may twist the right end portion of the display screen 21 in a direction indicated by arrow C in FIG. 2E. As illustrated in FIG. 2F, the user may also twist the right end portion of the display screen 21 in a direction indicated by arrow D in FIG. 2F.

The body illustrated in FIG. 1A is made of, for example, a resin material and has a thickness so as to be deformable. The body 4 includes a distortion gauge 41 that detects deformation of the right end portion of the display screen 21 and a hinge 42 used for folding the terminal apparatus 1.

As illustrated in FIG. 1B, the distortion gauge 41 is disposed in the right end portion in the longitudinal direction of the body 4. As illustrated in FIG. 1A, the distortion gauge 41 extends from one end of the body 4 in the width direction of the body 4 to the other end. The distortion gauge 41 may be disposed inside the display screen 21 or may be disposed between the back surface of the display screen 21 and the front surface of the body 4.

For example, a metal foil semiconductor or a conductive semiconductor is attached to the distortion gauge 41. When the user bends a portion of the display screen 21 (hereinafter, referred to as a gauge portion 21a) corresponding to the location of the distortion gauge 41 in the longitudinal direction of the terminal apparatus 1, the electrical resistance value of the distortion gauge 41 is changed. When the change in the electrical resistance value detected, distortion of the distortion gauge 41 is thereby detected.

In this exemplary embodiment, the distortion gauge 41 is provided to detect deformation of the gauge portion 21a illustrated in FIGS. 2A to 2F. Note that a piezoelectric device may be provided instead of the distortion gauge 41. In this case, when the gauge portion 21a is deformed, a change in the value of current flowing through the piezoelectric device is detected, and a displacement occurring in the piezoelectric device is detected.

The hinge 42 is disposed in a central portion in the longitudinal direction of the body 4 and extends from the one end of the body 4 in the width direction of the body 4 to the other end. A right part in the longitudinal direction of the terminal apparatus 1 in FIG. 1B is pivoted counterclockwise around the hinge 42, and the terminal apparatus 1 may be folded as illustrated in FIG. 1C.

The controller 3 and the power controller 5 are disposed in an end portion of a left part in the longitudinal direction of the body 4 in FIG. 1A (a part opposite to the part where the distortion gauge 41 is disposed) (see FIG. 1A).

In this exemplary embodiment, when the user bends the gauge portion 21a of the display screen 21 (see FIGS. 2A to 2F), the distortion gauge 41 is distorted. Detection of the distortion leads to detection of the deformation of the gauge portion 21a.

Further, in this exemplary embodiment, when the deformation of the gauge portion 21a is detected, a function of the terminal apparatus 1 is implemented on the display screen 21. In other words, when the user bends the gauge portion 21a, the terminal apparatus 1 executes one of multiple predetermined processes (hereinafter, referred to as deformation-triggered processes) regardless of whether the central portion of the display screen 21 is bent. The deformation-triggered processes will be described specifically and in detail later.

Figure 3:
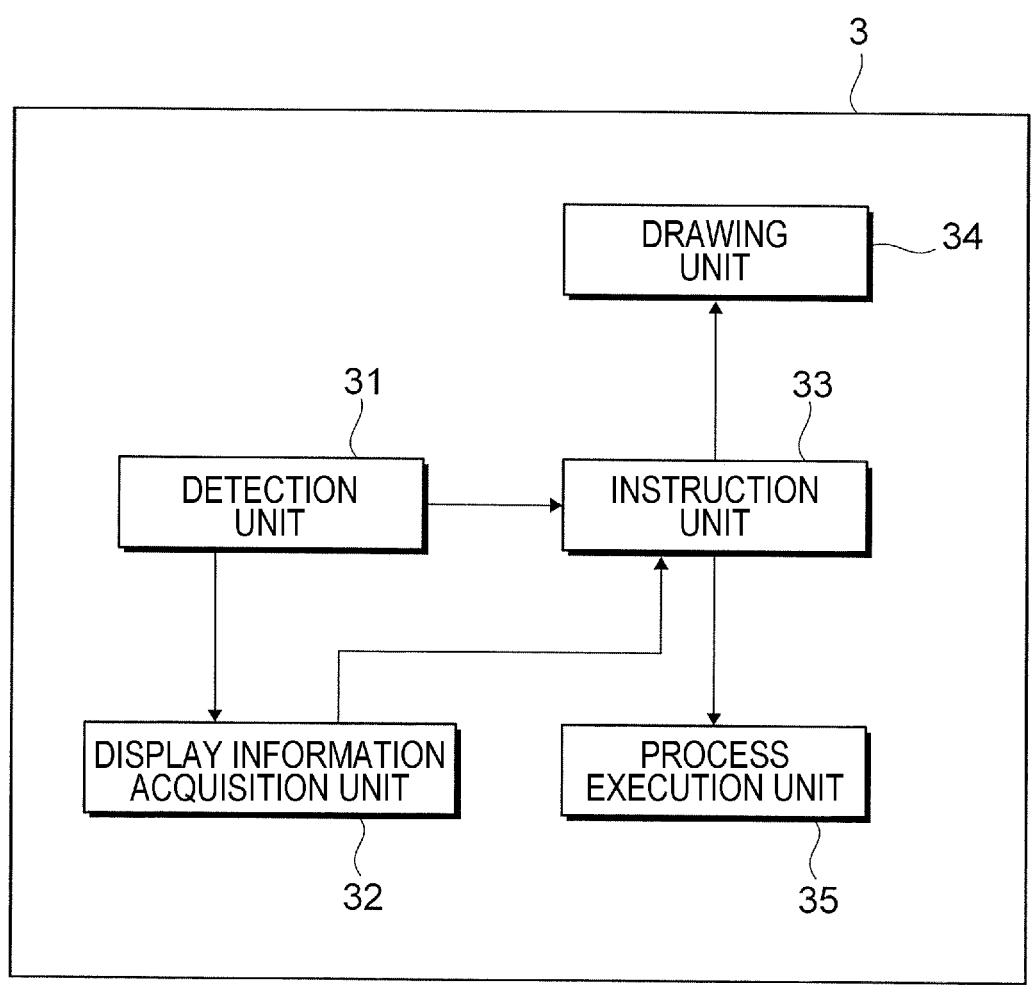
FIG. 3 is a diagram illustrating an example functional configuration of a controller for executing deformation-triggered processes.

FIG. 3 is a diagram illustrating an example functional configuration of the controller 3 for executing the deformation-triggered processes.

The controller 3 includes a detection unit 31 that detects deformation of the gauge portion 21a on the display screen 21 and a display information acquisition unit 32 that acquires information regarding display on the display screen 21. The controller 3 also includes an instruction unit 33 that issues instructions for the details of processes to be executed as the deformation-triggered processes, a drawing unit 34 that controls an image to be displayed on the display screen 21, and a process execution unit 35 that executes various processes as the deformation-triggered processes.

The detection unit 31 detects deformation of the gauge portion 21a on the basis of a change in the electrical resistance value of the distortion gauge 41 accompanying the deformation of the gauge portion 21a. Specifically, if an amount of change in the electrical resistance value of the distortion gauge larger than a predetermined threshold, the detection unit 31 detects the deformation of the gauge portion 21a.

The detection unit 31 also detects an amount of deformation of the gauge portion 21a on the basis of the degree of change in the electrical resistance value.

The detection unit 31 also detects whether the gauge portion 21a of the display screen 2 is deformed toward the user (see FIGS. 2A, 2C, and 2F) or away from the user (see FIGS. 2B, 2D, and 2E). Further, the detection unit 31 detects the number of times the gauge portion 21a is deformed within a predetermined time.

The detection unit 31 transmits the detection information to the display information acquisition unit 32 and the instruction unit 33.

The display information acquisition unit 32 acquires information regarding display performed on the display screen 21 when the gauge portion 21a is deformed on the display screen 21. Examples of the acquired information include information regarding an image, information regarding data (such as a document file), and information regarding application software.

The display information acquisition unit 32 transmits acquired information to the instruction unit 33.

On the basis of the information acquired from the detection unit 31 and the display information acquisition unit 32, the instruction unit 33 determines the details of a deformation-triggered process to be executed. The instruction unit 33 transmits an instruction needed to execute the deformation-triggered process to one or both of the drawing unit 34 and the process execution unit 35.

The drawing unit 34 displays the image on the display screen 21 in accordance with the instruction from the instruction unit 33.

The process execution unit 35 executes a process for running application software or another process in accordance with the instruction from the instruction unit 33.

Processes executed by the drawing unit 34 and the process execution unit 35 will be described in detail later. The instruction unit 33, the drawing unit 34, and the process execution unit 35 are each an example of an execution unit.

A detection process executed by the terminal apparatus 1 when the gauge portion 21a is deformed on the display screen 21 will be described.

Figure 4:
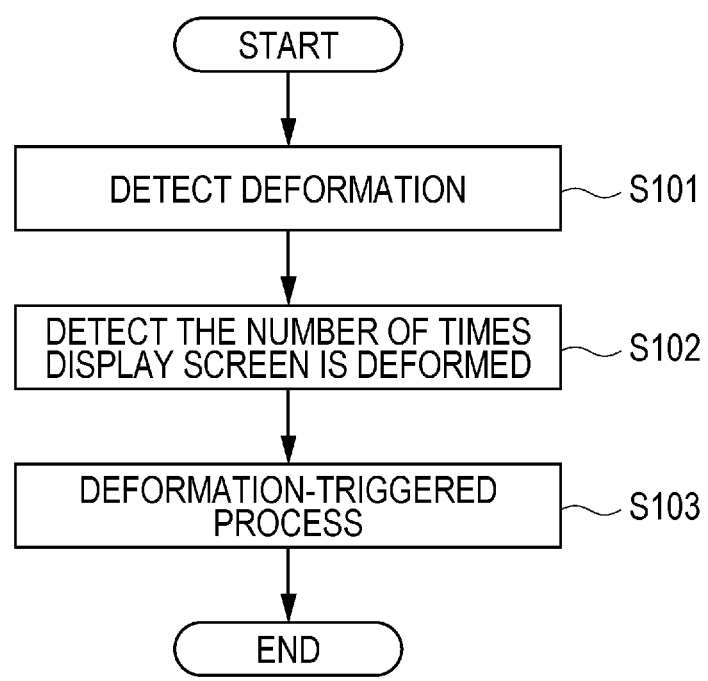
FIG. 4 is a flowchart of a detection process executed by the terminal apparatus when a gauge portion is deformed.

FIG. 4 is a flowchart of the detection process executed by the terminal apparatus 1 when the gauge portion 21a is deformed.

First, the user bends the gauge portion 21a of the display screen 21, the detection unit 31 detects deformation of the gauge portion 21a (step S101).

The detection unit 31 detects the number of times the gauge portion 21a is deformed within a predetermined time after the detection of deformation of the gauge portion 21a (step S102). The number of times includes a time when the gauge portion 21a is first deformed (the deformation of the gauge portion 21a that causes the detection unit 31 to start measurement of the predetermined time). The detection unit 31 transmits the detection information to the instruction unit 33.

On the basis of the information acquired from the detection unit 31, the instruction unit 33 determines the details of a process to be executed as one of the deformation-triggered processes. The instruction unit 33 transmits an instruction needed to execute the determined deformation-triggered process to one or both of the drawing unit 34 and the process execution unit 35. Thereafter, the deformation-triggered process is executed (step 103).

The deformation-triggered processes will be described specifically.

In this exemplary embodiment, different processes (forward/backward-deformation-triggered processes) are respectively executable for cases where the gauge portion 21a of the display screen 21 is deformed toward the user and away from the user. Different processes (times-based processes) are also executable as the deformation-triggered processes in accordance with the number of times the gauge portion 21a is deformed within the predetermined time.

Different processes (accumulated-times-based processes) are also executable as the deformation-triggered processes, depending on the number of times deformation of the gauge portion 21a is detected. In addition, execution of a deformation-triggered process may be continued while the gauge portion 21a is in a deformed state (a continuation process). Further, different processes (deformation-degree-based processes) are executable as the deformation-triggered processes, depending on the degree of deformation of the gauge portion 21a. Still further, one of different processes (variation-based processes) is executable as the corresponding deformation-triggered process every time deformation of the gauge portion 21a is detected.

Times-Based Processes

FIGS. 5A to 5D are each a diagram illustrating a process for running application software for the corresponding deformation-triggered process. In the examples illustrated in FIGS. 5A to 5D, the process execution unit 35 executes different processes by using the application software in accordance with the number of times the gauge portion 21a is deformed on the display screen 21.

Figure 5A:
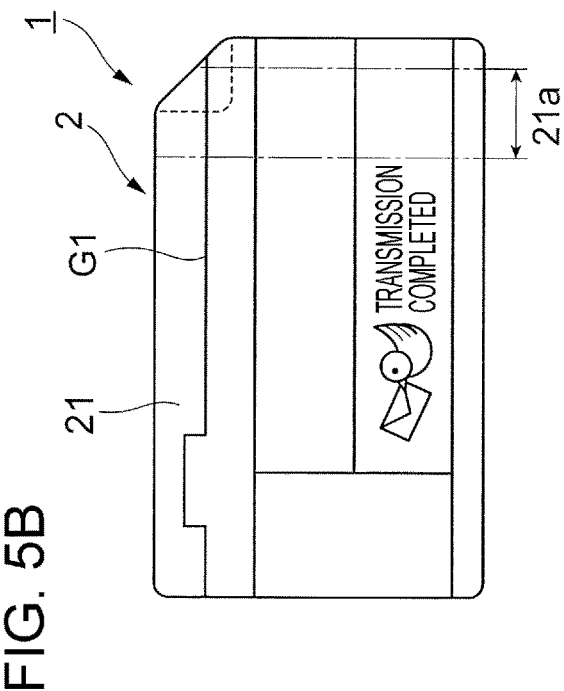
FIGS. 5A, 5B, 5C, and 5D are each a diagram illustrating a process for running application software for a deformation-triggered process.

As illustrated in FIG. 5A, the user bends the gauge portion 21a of the display screen 21 one time. Specifically, the user bends the upper-right corner portion of the display screen 21. In response, the process execution unit 35 initiates e-mail application software as illustrated in FIG. 5A. This causes an image G1 associated with the e-mail application software to be displayed on the display screen 21.

The user performs an operation of bending the gauge portion 21a two times within a predetermined time (for example, one second) (bends the gauge portion 21a two times in succession) in the state illustrated in FIG. 5A. In response, the process execution unit 35 transmits an e-mail created by the user, as illustrated in FIG. 5B.

Figure 5B:
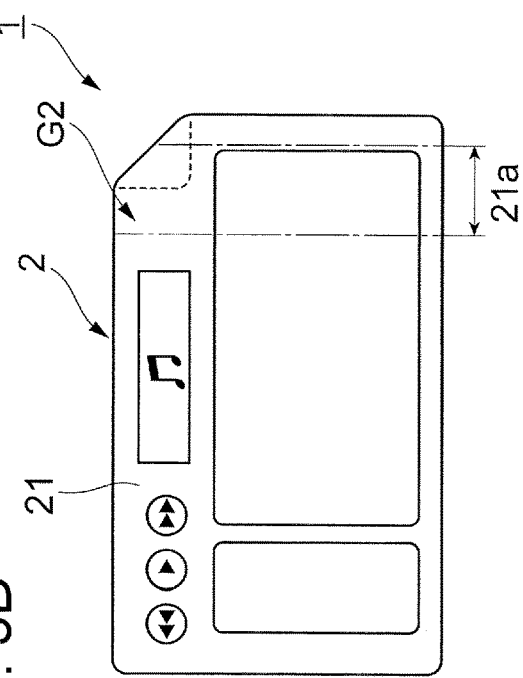

The example of the process executed when the user performs an operation of bending the gauge portion 21a two times within the predetermined time is not limited to the example illustrated in FIG. 5B. For example, if the user bends the gauge portion 21a two times within one second in the state illustrated in FIG. 5A, the process execution unit 35 may execute a process for terminating the e-mail application software as illustrated in FIG. 5C.

Figure 5C:
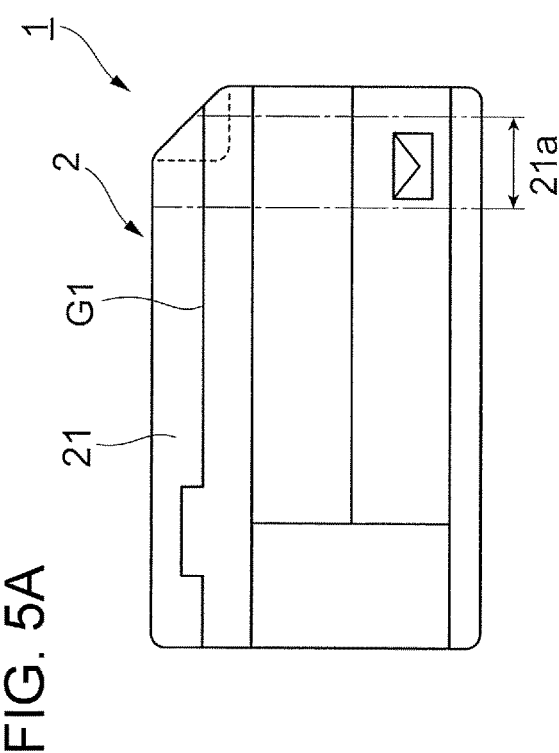
Figure 5D:
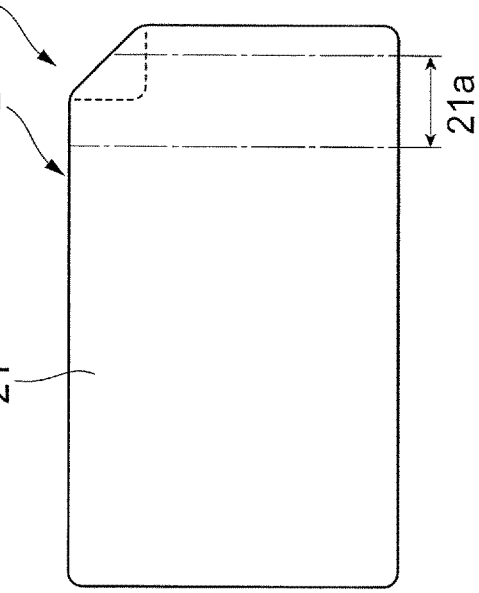

Further, if the user bends the gauge portion 21a two times within one second in the state illustrated in FIG. 5A, the process execution unit 35 may execute a process for running music application software different from the e-mail application software, as illustrated in FIG. 5D. In other words, the functions may be switched in accordance with the number of times the detection unit 31 detects deformation of the gauge portion 21a within the predetermined time. This causes an image G2 associated with the music application software to be displayed on the display screen 21. In response, the process execution unit 35 may terminate the e-mail application software or may continue running the e-mail application software.

Note that regardless of whether the e-mail application software is running, the process execution unit 35 may execute a process for running the music application software if the user bends the gauge portion 21a two times within one second.

In addition, the process execution unit 35 may also execute one of the processes illustrated in FIGS. 5B to 5D in accordance with the number of times the user bends the gauge portion 21a in the state illustrated in FIG. 5A.

For example, if the user bends the gauge portion 21a one time within one second in the state illustrated in FIG. 5A, the process execution unit 35 transmits an e-mail created by the user as illustrated in FIG. 5B.

If the user bends the gauge portion 21a two times within one second in the state illustrated in FIG. 5A, the process execution unit 35 terminates the e-mail application software, as illustrated in FIG. 5C.

Further, if the user bends the gauge portion 21a three times within one second in the state illustrated in FIG. 5A, the process execution unit 35 runs the music application software as illustrated in FIG. 5D.

Variation-Based Processes

The process execution unit 35 may execute one of the processes illustrated in FIGS. 5A to 5D in turn every time the gauge portion 21a is deformed.

For example, if the user bends the gauge portion 21a one time, the process execution unit 35 initiates the e-mail application software as illustrated in FIG. 5A.

If the user bends the gauge portion 21a in the state illustrated in FIG. 5A one time, the process execution unit 35 transmits an e-mail created by the user as illustrated in FIG. 5B.

Further, if the user bends the gauge portion 21a in the state illustrated in FIG. 5B one time, the process execution unit 35 terminates the e-mail application software as illustrated in FIG. 5C.

Still further, if the user bends the gauge portion 21a in the state illustrated in FIG. 5C one time, the process execution unit 35 runs the music application software as illustrated in FIG. 5D.

In addition, if the user bends the gauge portion 21a one time in the state illustrated in FIG. 5A, and if an e-mail that has been created but has not been transmitted yet is present, the process execution unit 35 may execute the e-mail transmission process (see FIG. 5B). If an e-mail that has been created but has not been transmitted yet is not present, the process execution unit 35 may terminate the e-mail application software (see FIG. 5C).

Forward/Backward-Deformation-Triggered Processes

If the user bends the gauge portion 21a toward them self in the state illustrated in FIG. 5A (see FIG. 2A), the process execution unit 35 may execute the e-mail transmission process (see FIG. 5B). If the user bends the gauge portion 21a away from them self (see FIG. 2B), the process execution unit 35 may terminate the e-mail application software (see FIG. 5C).

If the user bends the gauge portion 21a toward them self (see FIG. 2A), the process execution unit 35 may execute the process for initiating the e-mail application software (see FIG. 5A). If the user bends the gauge portion 21a away from them self (see FIG. 2B), the process execution unit 5 may initiate the music application software (see FIG. 5D).

Forward/Backward-Deformation-Triggered Processes

Figure 6A:
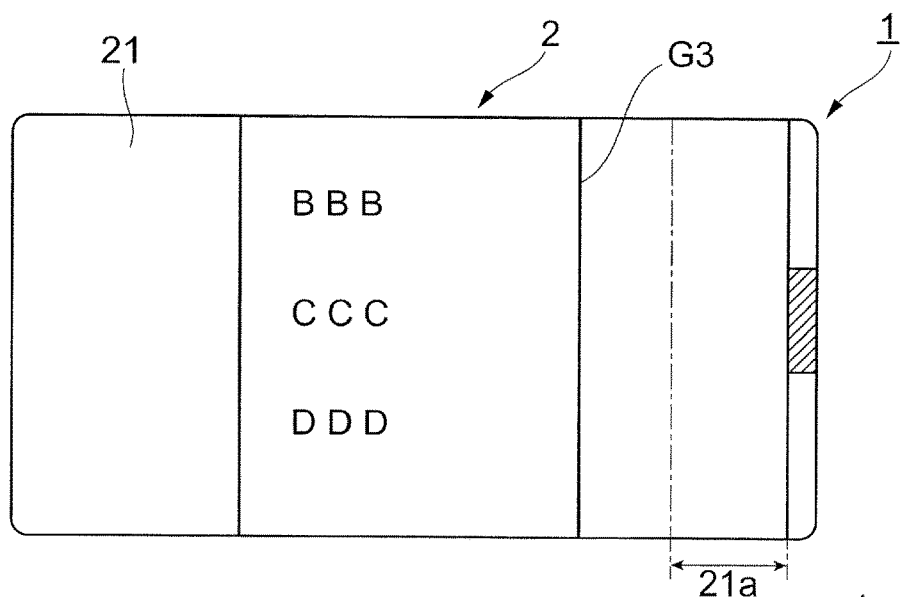
FIGS. 6A, 6B, and 6C are each a diagram illustrating a process related to image display on a display screen as a deformation-triggered process.
Figure 6B:
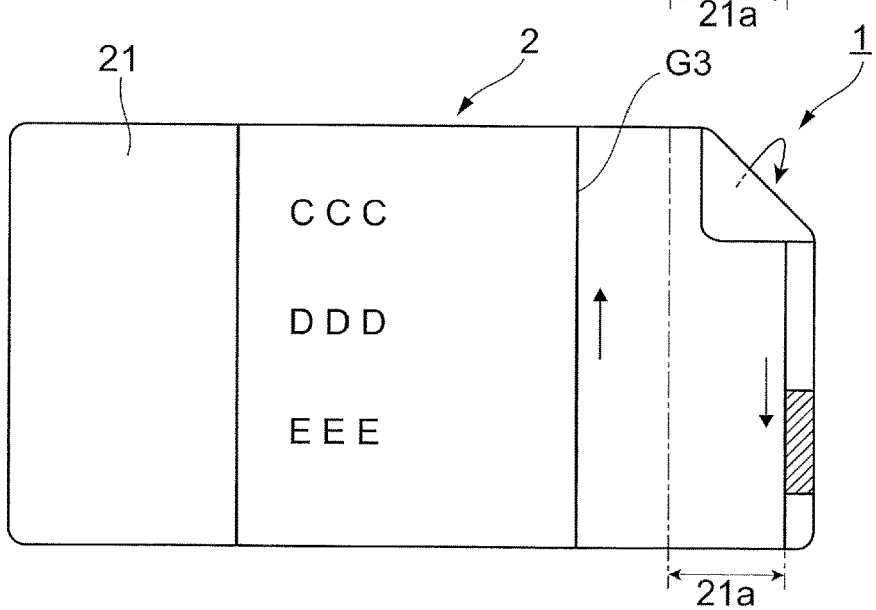
Figure 6C:
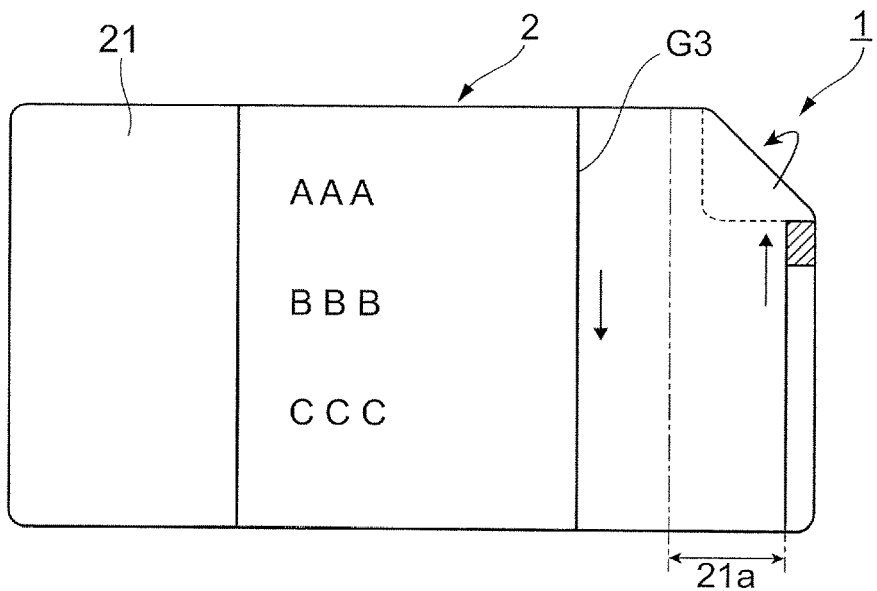

FIGS. 6A to 6C are each a diagram illustrating a process related to image display on the display screen 21 as a deformation-triggered process. In each of the examples illustrated in FIGS. 6A to 6C, the drawing unit 34 scrolls, as the process related to the image display, an image displayed as the content of a document file on the display screen 21.

As illustrated in FIG. 6A, a document file image G3 representing the content of the document file is displayed on the display screen 21. The document file image G3 illustrated in FIG. 6A has been scrolled downward to a certain extent in accordance with a user operation performed after the document file is opened. Specifically, a string of characters "BBB", a string of characters "CCC", and a string of characters "DDD" in the document file image G3 are displayed on the display screen 21 in this order from the top.

As illustrated in FIG. 6B, the user bends the gauge portion 21a of the display screen 2 in the state illustrated in FIG. 6A toward them self. Specifically, the user bends the upper-right corner portion of the display screen 21 toward them self. In response, the detection unit 31 detects deformation of the gauge portion 21a toward the user. The display information acquisition unit 32 acquires the content of the document file image G3 displayed on the display screen 21. The display information acquisition unit 32 transmits the acquired information to the instruction unit 33.

The instruction unit 33 instructs the drawing unit 34 to further scroll the document file image G3 downward in accordance with the acquired information.

The drawing unit 34 scrolls the document file image G3 downward.

As the result of this, a string of characters "EEE" is newly displayed in the document file image G3 in the lower portion of the display screen 21. Specifically, the string of characters "CCC", the string of characters "DDD", and the string of characters "EEE" are displayed as the document file image G3 on the display screen 21 in this order from the top. The string of characters "BBB" displayed in the upper portion of the display screen 21 in FIG. 6A has disappeared.

As illustrated in FIG. 6C, the user bends the gauge portion 21a in the state illustrated in FIG. 6A away from them self. Specifically, the user bends the upper-right corner portion of the display screen 21 away from them self. In response, the drawing unit 34 scrolls the document file image G3 upward.

As the result of this, a string of characters "AAA" is newly displayed in the document file image G3 in the upper portion of the display screen 21. Specifically, the string of characters "AAA", the string of characters "BBB", and the string of characters "CCC" are displayed as the document file image G3 on the display screen 21 in this order from the top. The string of characters "DDD" displayed in the lower portion of the display screen 21 in FIG. 6A has disappeared.

In this exemplary embodiment as described above, if the gauge portion 21a is deformed toward the user, the drawing unit 34 scrolls the document file image G3 downward. If the gauge portion 21a is deformed away from the user, the drawing unit 34 scrolls the document file image G3 upward.

In other words, if the gauge portion 21a is deformed toward the user, the drawing unit 34 updates the image displayed on the display screen 21. If the gauge portion 21a is deformed away from the user, the drawing unit 34 displays an image prior to the update on the display screen 21.

In particular, if the user bends the upper-right corner portion of the display screen 21 toward them self in this exemplary embodiment (see FIG. 6B), the bent portion of the gauge portion 21a may be considered to be turned downward such that the direction of rotation is downward when viewed from the front. In this case, the drawing unit 34 scrolls the document file image G3 downward.

If the user bends the upper-right corner portion of the display screen 21 away from them self (see FIG. 6C), the bent portion of the gauge portion 21a may be considered to be turned upward such that the direction of rotation is upward when viewed from the front. In this case, the drawing unit 34 scrolls the document file image G3 upward.

Accordingly, the user performs the intuitive operation for turning the portion to be deformed in the gauge portion 21a in a direction corresponding to an intended scrolling direction for the document file image G3, and the document file image G3 is thereby scrolled upward or downward.

Alternatively, if the bent portion of the gauge portion 21a is turned upward, the drawing unit 34 may scroll the document file image G3 downward. In this case, if the bent portion of the back surface of the terminal apparatus 1 is turned downward, the document file image G3 is scrolled downward.

If the bent portion of the gauge portion 21a is turned downward, the drawing unit 34 may scroll the document file image G3 upward. In this case, if the bent portion of the back surface of the terminal apparatus 1 is turned upward, the document file image G3 is scrolled upward.

Accordingly, the user performs the intuitive operation for turning the portion to be deformed of the back surface of the terminal apparatus 1 in a direction corresponding to an intended scrolling direction for the document file image G3, and the document file image G3 is thereby scrolled upward or downward.

Note that the drawing unit 34 scrolls an image upward or downward as a deformation-triggered process in this exemplary embodiment but may scroll the image rightward or leftward.

For example, if the user bends the upper-right corner portion of the display screen 21 toward them self (see FIG. 6B), the bent portion of the gauge portion 21a may be considered to be turned leftward such that the direction of rotation is leftward when viewed from the front in FIG. 6B. In this case, the drawing unit 34 may stroll the document file image G3 leftward.

If the user bends the upper-right corner portion of the display screen 21 away from them self (see FIG. 6C), the bent portion of the gauge portion 21a may be considered to be turned rightward such that the direction of rotation is rightward when viewed from the front in FIG. 6C. In this case, the drawing unit 34 may scroll the document file image G3 rightward.

Alternatively, if the bent portion of the gauge portion 21a is turned rightward, the drawing unit 34 may scroll the document file image G3 leftward. In this case, if the bent portion of the back surface of the terminal apparatus 1 is turned leftward, the document file image G3 is scrolled leftward.

If the bent portion of the gauge portion 21a is turned leftward, the drawing unit 34 may scroll the document file image G3 rightward. In this case, if the bent portion of the back surface of the terminal apparatus 1 is turned rightward, the document file image G3 is scrolled rightward.

Although the drawing unit 34 scrolls the document file image G3 displayed on the display screen 21 as a deformation-triggered process in this exemplary embodiment, the image displayed on the display screen 21 may be changed to another image as a deformation-triggered process. For example, one of multiple images arranged in a predetermined order in a folder is displayed on the display screen 21. In one of the cases where the gauge portion 21a is deformed toward the user and where the gauge portion. 21a is deformed away from the user, one of the images arranged in the folder that follows the displayed image may be displayed on the display screen 21. In the other case, one of the images arranged in the folder that precedes the displayed image may be displayed.

Forward/Backward-Deformation-Triggered Processes

Figure 7A:
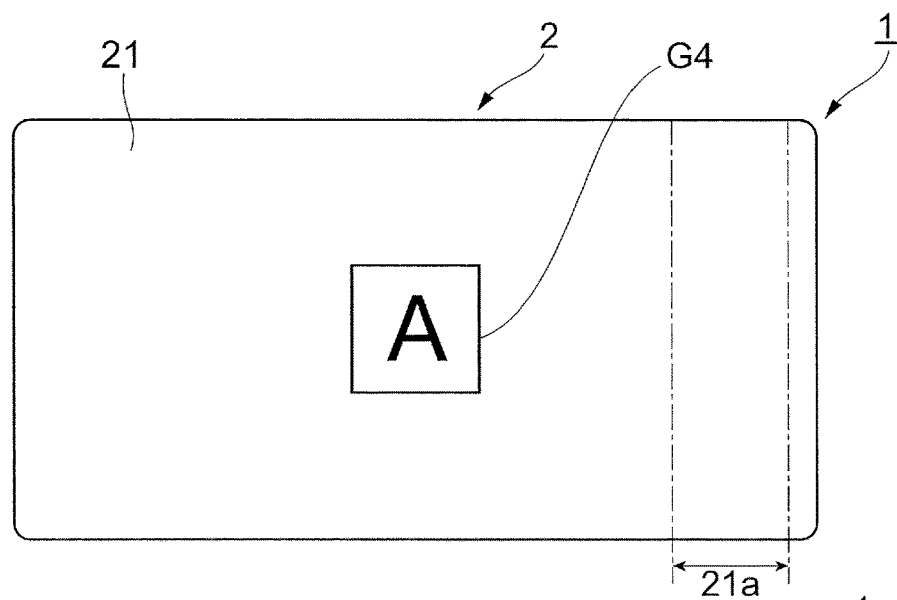
FIGS. 7A, 7B, and 7C are each a diagram illustrating a process related to image display on the display screen as a deformation-triggered process.
Figure 7B:
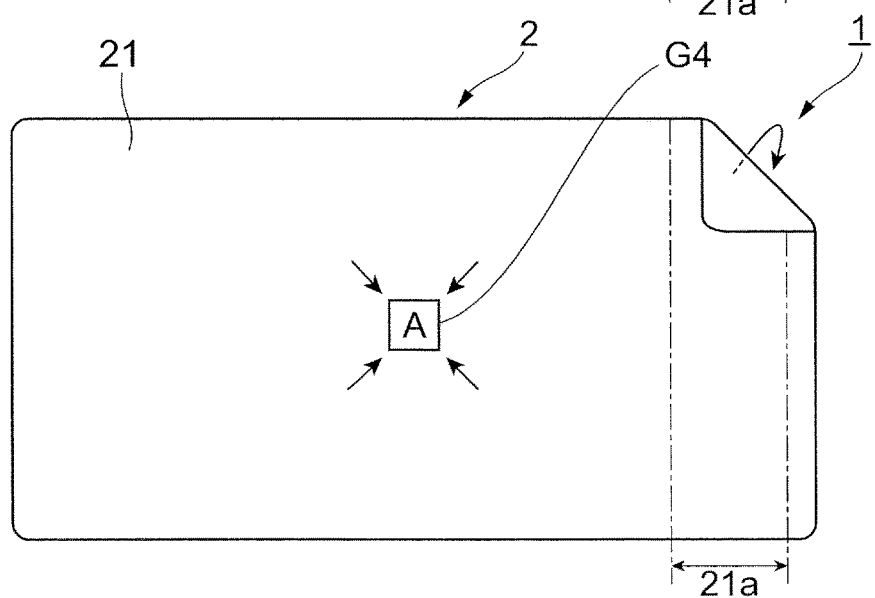
Figure 7C:
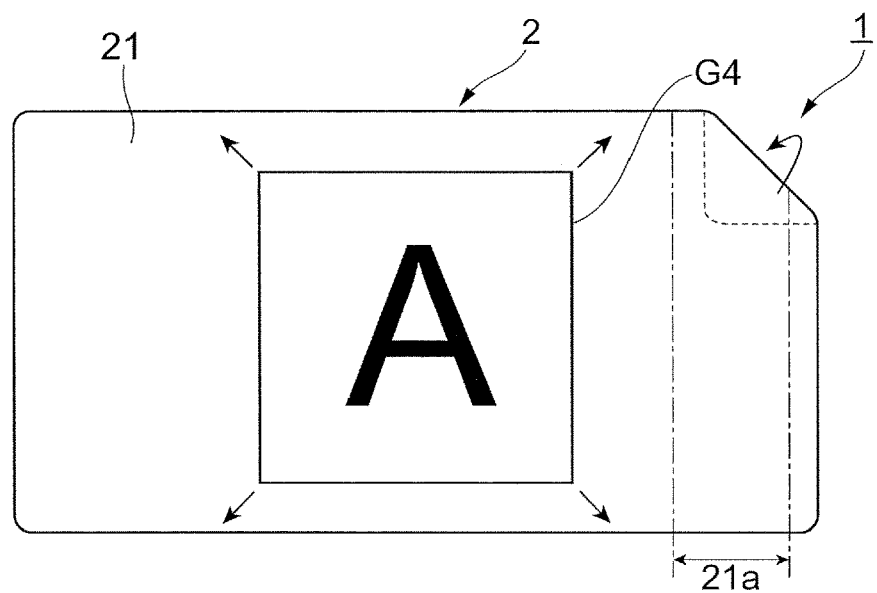

FIGS. 7A to 7C are each a diagram illustrating a process related to image display on the display screen 21 as a deformation-triggered process. In each of the examples illustrated in FIGS. 7A to 7C, the drawing unit 34 enlarges or reduces, as the process related to the image display, an image displayed on the display screen 21.

As illustrated in FIG. 7A, an image G4 of the letter A is displayed on the display screen 21. As illustrated in FIG. 7B, the user bends the gauge portion 21a of the display screen 21 in the state illustrated in FIG. 7A toward them self. Specifically, the user bends upper-right corner portion of the display screen 21 toward them self. In response, the drawing unit 34 displays the image G4 in a reduced state.

As illustrated in FIG. 7C, the user bends the gauge portion 21a in the state illustrated in FIG. 7A away from them self. Specifically, the user bends the upper-right corner portion of the display screen 21 away from them self. In response, the drawing unit 34 displays the image G4 in an enlarged state.

In this exemplary embodiment as described above, if the user bends the upper-right corner portion of the display screen 21 toward them self as illustrated in FIG. 7B (bends the part of the display screen 21 as if the part were made smaller), the drawing unit 34 displays the reduced image G4. If the user bends the upper-right corner portion of the display screen 21 away from them self as illustrated in FIG. 7C (bends the part of the display screen 21 as if the part were expanded), the drawing unit 34 displays the enlarged image G4. Accordingly, the user performs the intuitive operation for contracting or expanding the part of the display screen 21, and the displayed image G4 is thereby reduced or enlarged.

If the user bends the upper-right corner portion of the display screen 21 toward them self, the drawing unit 34 may display the enlarged image G4. If the user bends the upper-right corner portion of the display screen 21 away from them self, the drawing unit 34 may display the reduced image G4.

Forward/Backward-Deformation-Triggered Processes

Figure 8A:
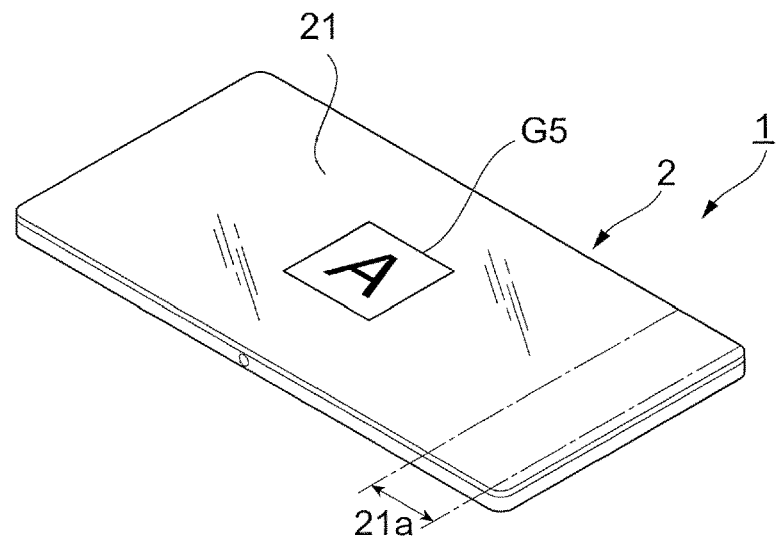
FIGS. 8A, 8B, and 8C are each a diagram illustrating a process related to image display on the display screen as a deformation-triggered process.
Figure 8B:
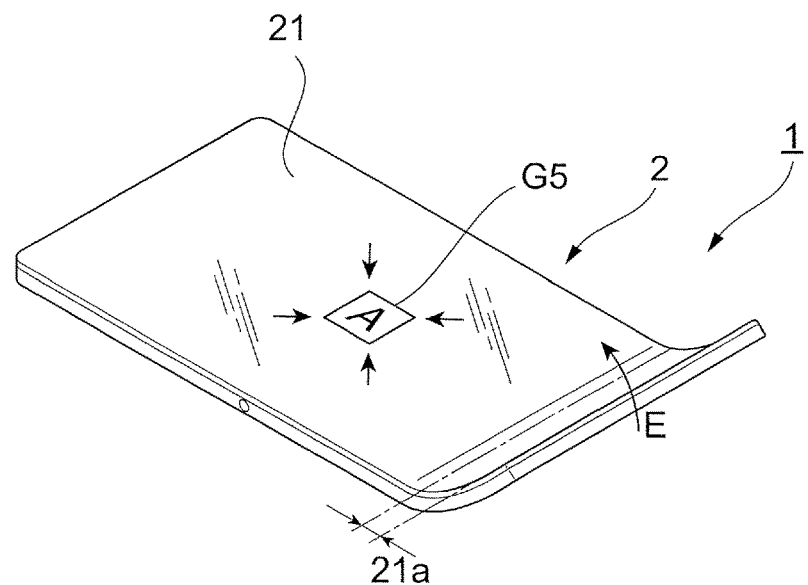
Figure 8C:
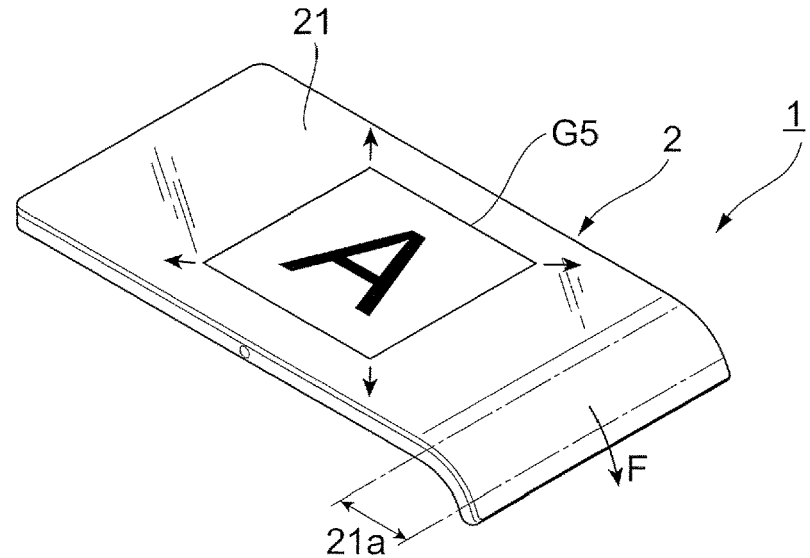

FIGS. 8A to 8C are each a diagram illustrating a process related to image display on the display screen 21 as a deformation-triggered process. In the examples illustrated in FIGS. 8A to 8C, if the user bends the whole gauge portion 21a of the display screen 21 in a direction toward the other end portion (leftward in FIGS. 8A to 8C), the drawing unit 34 enlarges or reduces an image displayed on the display screen 21.

As illustrated in FIG. 8A, an image G5 of the letter A displayed on the display screen 21.

As illustrated in FIG. 8B, the user bends the whole gauge portion 21a of the display screen 21 in the state illustrated in FIG. 8A in a direction indicated by arrow E in FIG. 8B (counterclockwise in FIG. 8B). In other words, the user bends the gauge portion 21a in such a manner that the gauge portion 21a is curving away. In response, the drawing unit 34 displays the image G5 in a reduced state.

As illustrated in FIG. 8C, the user bends the whole gauge portion 21a in the state illustrated in FIG. 8A in a direction indicated by arrow F in FIG. 8C (clockwise in FIG. 8C). In other words, the user bends the gauge portion 21a in such a manner that the gauge portion 21a is curving upward. In response, the drawing unit 34 displays the image G5 in an enlarged state.

Alternatively, if the user bends the whole gauge portion 21a of the display screen 21 counterclockwise in FIG. 8B, the drawing unit 34 may display the enlarged image G5. If the user bends the whole gauge portion 21a clockwise in FIG. 8C, the drawing unit 34 may display the reduced image G5.

Deformation-Degree-Based Processes

In this exemplary embodiment, different processes may be executed, respectively, as the deformation-triggered processes in accordance with deformation of the gauge portion 21a.

For example, in the examples illustrated in FIGS. 6A to 6C, as the user increases the degree of bending of the gauge portion 21a, the drawing unit 34 may scroll an image more rapidly.

Further, in the examples illustrated in FIGS. 7A to 8C, as the user increases the degree of bending of the gauge portion 21a, the drawing unit 34 may display an image enlarged or reduced to a larger degree on the display screen 21.

Further, if an amount of deformation of the gauge portion 21a is larger than a predetermined amount of deformation, the drawing unit 34 does not have to display an image on the display screen 21. Still further, if an amount of deformation of the gauge portion 21a is larger than a predetermined amount of deformation, the power controller 5 may switch off the terminal apparatus 1.

Still further, the process execution unit 35 may run different application software in accordance with an amount of deformation of the gauge portion 21a.

Continuation Process

While the user is bending the gauge portion 21a of the display screen 21, a deformation-triggered process may be continued.

For example, in the examples illustrated in FIGS. 6 to 6C, while the user is bending the gauge portion 21a, the drawing unit 34 may continue scrolling the image displayed on the display screen 21.

Further, in the examples illustrated in FIGS. 7A to 8C, while the user is bending the gauge portion 21a, the drawing unit 34 may continue enlarging or reducing the image.

Accumulated-Times-Based Processes

In the examples illustrated in FIGS. 6A to 6C, as the number of times the user bends the gauge portion 21a within one second increases, the drawing unit 34 may scroll an image more rapidly. In the examples illustrated in FIGS. 7A to 8C, as the number of times the user bends the gauge portion 21a within one second increases, the drawing unit 34 may enlarge or reduce the image to a larger extent.

Other Example Deformation-Triggered Processes

Different processes may be executed in accordance with the content displayed on the display screen 21.

For example, if an image file is displayed on the display screen 21, and if the user bends the gauge portion 21a, the drawing unit 34 displays the image file in an enlarged or reduced state. If a web browser window is displayed on the display screen 21, and if the user bends the gauge portion 21a, the drawing unit 34 may scroll the web browser window.

In addition, printing an image displayed on the display screen 21 may also be performed as a deformation-triggered process. In this case, if the user bends the gauge portion 21a, the instruction unit 33 instructs the process execution unit 35 to print the image displayed on the display screen 21.

In accordance with the instruction from the instruction unit 33, the process execution unit 35 then outputs a printing instruction to an image forming apparatus (not illustrated) connected to the terminal apparatus 1 through a network. Application software related to the image forming is thereby run, and printing is performed.

Prohibition Process

Since the user touches the display screen for a deformation-triggered process, a prohibition process for temporarily disabling a user touch operation on the touch panel may be executed during the deformation-triggered process.

Note that deformation of the central portion of the display screen 21 may also cause an update of display on the display screen 21 resulting from a deformation-triggered process.

Nevertheless, even though deformation of the gauge portion 21a of the display screen 21 causes an update of the display on the display screen 21 resulting from a deformation-triggered process in this exemplary embodiment as illustrated in FIGS. 5A to 8C, the user easily recognizes the updated display. This is because to display an image on the display screen 21, the image is generally displayed with the central portion of the display screen 21 serving as a center for displaying the image in many cases. In this respect, deformation of the end portion of the display screen 21 causes a deformation-triggered process to be executed in this exemplary embodiment, and the central portion of the display screen 21 has thus not been deformed at the time of the update of the display on the display screen 21 resulting from the deformation-triggered process.

The hardware configuration of the terminal apparatus 1 will be described.

Figure 9:
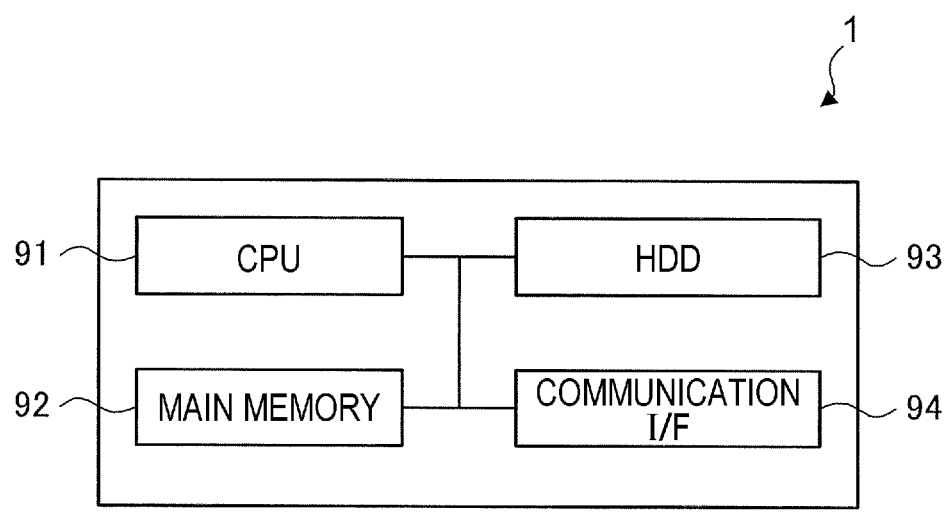
FIG. 9 is a diagram illustrating an example hardware configuration of the terminal apparatus.

FIG. 9 is a diagram illustrating an example hardware configuration of the terminal apparatus 1. The terminal apparatus 1 includes a central processing unit (CPU) 91, main memory 92, and a hard disk drive (HDD) 93. The CPU 91 runs various programs such as an operating system (OS) and the application software. The main memory 92 stores the various programs, data used for running the programs, and the like. The HDD 93 stores data to be input to the various programs, data output from the various programs, and the like. The terminal apparatus 1 further includes a communication interface (I/F) 94 for communicating with external apparatuses.

The aforementioned processes executed by the terminal apparatus 1 in this exemplary embodiment are provided by using programs such as application software.

Note that the programs that implement this exemplary embodiment may be provided in such a manner as to be stored in a recording medium such as a compact disk read-only memory (CD-ROM).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display device comprising:
   an image display including a display screen at least one end portion of which is deformable; and
   a computer programmed to:
      detect deformation of the end portion; and
      execute a deformation-triggered process if the deformation of the end portion is detected,
         wherein during the deformation-triggered process, an operation on the touch panel is not accepted.

2. The display device according to claim 1,
   wherein if the deformation of the end portion is detected, the computer is further programmed to execute a first process, and if the deformation of the end portion is again detected after the first process is executed, the computer is further programmed to execute a second process different from the first process.

3. The display device according to claim 1,
   wherein the computer is further programmed to execute a process in accordance with how many times the deformation of the end portion is detected within a predetermined time.

4. The display device according to claim 1,
   wherein while the deformation of the end portion is detected, the computer is further programmed to continue executing the deformation-triggered process.

5. The display device according to claim 1,
   wherein if the deformation of the end portion is detected, and the deformation includes bending a whole of the end portion of the display screen, the computer is further programmed to enlarge or reduce an image displayed on the display screen.

6. The display device according to claim 1,
   wherein if the deformation of the end portion is detected, the computer is further programmed to initiate application software in accordance with an amount of deformation of the end portion.

7. The display device according to claim 1, the display device further comprising:
   a body that supports the image display;
   a hinge disposed in a central portion in a longitudinal direction of the body, the hinge extending from one end of the body in a width direction of the body to the other end of the body,
   wherein the display device is folded when a portion of the body in the longitudinal direction is pivoted around the hinge.

8. The display device according to claim 1, wherein the computer is further programmed to execute different processes, respectively, in a case where deformation of the end portion toward a user is detected and a case where deformation away from the user is detected.

9. The display device according to claim 8, wherein in one of the case where deformation of the end portion toward a user is detected and a case where deformation away from the user is detected, the computer is further programmed to change an image displayed on the display screen, and in the other case, the computer is further programmed to display the image that is unchanged on the display screen.

10. A non-transitory computer readable medium storing a program causing a computer to execute a process, the computer functioning as a terminal apparatus including an image display including a display screen at least one end portion of which is deformable, the process comprising:
    detecting deformation of the end portion; and
    executing a deformation-triggered process if the deformation of the end portion is detected,
       wherein during the deformation-triggered process, an operation on the touch panel is not accepted.

* * * * *